United States Patent [19]
Nishikawa

[11] Patent Number: 5,842,035
[45] Date of Patent: Nov. 24, 1998

[54] PARALLEL COMPUTER UTILIZING LESS MEMORY BY HAVING FIRST AND SECOND MEMORY AREAS

[75] Inventor: Junji Nishikawa, Osaka, Japan

[73] Assignee: Matsushita Electric Industrial Co., Ltd., Kadoma, Japan

[21] Appl. No.: 410,077

[22] Filed: Mar. 24, 1995

[30] Foreign Application Priority Data

Mar. 31, 1994 [JP] Japan .................................. 6-062215

[51] Int. Cl.⁶ .................................................. G06F 15/16
[52] U.S. Cl. ............................... 395/800.14; 395/800.16
[58] Field of Search .................................... 395/800, 379, 395/287, 310, 566, 800.1, 800.11, 800.14, 800.16, 800.2; 711/184

[56] References Cited

U.S. PATENT DOCUMENTS

| | | | |
|---|---|---|---|
| 4,740,894 | 4/1988 | Lyon ........................................ | 395/476 |
| 4,821,187 | 4/1989 | Ueda et al. ............................. | 395/596 |
| 5,043,873 | 8/1991 | Muramatsu et al. .................... | 395/800 |
| 5,079,694 | 1/1992 | Nakagawa et al. ..................... | 395/492 |
| 5,095,527 | 3/1992 | Uramoto et al. ........................ | 395/800 |
| 5,138,704 | 8/1992 | Takahashi et al. ...................... | 395/800 |
| 5,297,255 | 3/1994 | Hamanaka et al. ..................... | 395/800 |
| 5,371,865 | 12/1994 | Aikawa et al. .......................... | 395/452 |
| 5,388,220 | 2/1995 | Okabayashi ............................. | 395/800 |
| 5,513,364 | 4/1996 | Nishikawa .............................. | 395/287 |

OTHER PUBLICATIONS

"High Performance Fortran Language Specification", High Performance Fortran Forum Jan. 25, 1993, pp. 1–111 & 7–18.

"Parallel Programming Language ADETRAN", by T. Nogi, Mem. Fac. Eng. Kyoto Univ. vol. 51, No. 4, (1989), pp. 235–290.

"VLSI Implementation of a Parallel Computer Network", by K. Kaneko et al., IEICE Transactions, vol. E 74, No. 11, Nov. 1991, pp. 3810–3818.

*Primary Examiner*—Todd R. Swann
*Assistant Examiner*—Christopher S. Chow
*Attorney, Agent, or Firm*—Price, Gess & Ubell

[57] ABSTRACT

A parallel computer comprising a plurality of processor elements and a network interconnecting the same, wherein each of the plurality of processor elements includes: a memory unit including a first area and a second area, the first area storing a program and a data portion allocated to the processor element, the second area having a smaller capacity than the first area and storing working data temporarily; a first data transferring unit for performing a first data transfer, whereby data necessary for an operation are transferred to the second area from the first areas of the other processor elements via the network to form a new data portion therein; a processor for performing a first operation, whereby the data portion in the first area is processed as per program and an operation result is restored into the first area, and for performing a second operation, whereby the new data portion in the second area is processed as per program and an operation result is restored into the second area; and a second data transferring unit for performing a second data transfer, whereby the operation results restored in the second areas in the other processor elements are transferred to the first area of the processor element via the network.

23 Claims, 24 Drawing Sheets

FIGURE 1
PRIOR ART

```
        DIMENSION   A(1:4, /1:4/)      ——— 60
        DIMENSION   B(1:4, /1:4/)      ——— 61
        DIMENSION   A(/1:4/, 1:4)      ——— 62
        DIMENSION   A(/1:4/, 1:4)      ——— 63

PDO J=1,4                      ——— 64
            DO 100 I=1,3               ——— 65
100         B(I,/J/)=A(I+1,/J/)*2.0    ——— 66
        PEND
        PASS I,J=1,4                   ——— 67
            A(/I/,J)=A(I,/J/)          ——— 68
            B(/I/,J)=B(I,/J/)          ——— 69
        PEND
        PDO I=1,4                      ——— 70
            DO 200 J=2,4               ——— 71
200         B(/I/,J)=A(/I/,J)+B(/I/,J-1) ——— 72
        PEND
```

FIGURE 2
PRIOR ART

| PE1 | PE2 | PE3 | PE4 |
|---|---|---|---|
|  |  |  |  |
| A(1:4,/1/) | A(1:4,/2/) | A(1:4,/3/) | A(1:4,/4/) |
| B(1:4,/1/) | B(1:4,/2/) | B(1:4,/3/) | B(1:4,/4/) |
|  |  |  |  |
| A(/1/:1:4) | A(/2/:1:4) | A(/3/:1:4) | A(/4/:1:4) |
| B(/1/:1:4) | B(/2/:1:4) | B(/3/:1:4) | B(/4/:1:4) |
|  |  |  |  |

FIGURE 8

| | |
|---|---|
| DIMENSION A(1:16, /1:16/) | ——50 |
| DIMENSION B(1:16, /1:16/) | ——51 |
| PDO J=1,16 | ——52 |
|     DO 100 I=1,15 | ——53 |
| 100    A(I,/J/)=A(I+1,/J/)*2.0 | ——54 |
| PEND | |
| PDO I=1,16 | ——55 |
|     DO 200 J=2,16 | ——56 |
| 200    A(/I/,J)=A(/I/,J)+B(/I/,J=1) | ——57 |
| PEND | |

FIGURE 9

```
    DIMENSION A(1:16,/1:16/) ———111
    DIMENSION B(1:16,/1:16/) ———112
    ib=1 ———113            ;STARTING NO. OF MULTIPLEXING  ⎫ PARTITION
    ie=4 ———114            ;ENDING NO. OF MULTIPLEXING    ⎬ DATA IN Y
    do 101 q=ib,ie ———115  ;COUNT BY q                    ⎭ DIRECTION  ⎫ CONTROL
101 pdo_body1(q) ———116    ;EXECUTION STATEMENT                        ⎬ MULTIPLEXING
                                                                       ⎭ OF VIRTUAL PE ⎫ EXECUTION STATEMENT
    ib=1 ———117            ;STARTING NO. OF MULTIPLEXING  ⎫                            ⎬
    ie=4 ———118            ;ENDING NO. OF MULTIPLEXING    ⎬ CONTROL                    ⎭
    do 201 q=ib,ie ———119  ;COUNT BY q                    ⎭ MULTIPLEXING
                                                            OF VIRTUAL PE
    if(q.eq.ib) call redist(local_array_ref(q),buf) ———120
                           ;RE-DISTRIBUTE VARIABLE IN RIGHT SIDE  ⎫
                            WHEN q=1    (A,B→T)                   ⎬ DATA TRANSFER
    if(q+1.le.ie) call NB_redist(local_array_ref(q+1),NOT.buf)———121 [R1]~[R4]
                           ;RE-DISTRIBUTE VARIABLE IN RIGHT SIDE  ⎭
                           ;IN PRECEDING LOOP WHEN q+1=2-4    (A,B→T)
    pdo_body2(q,buf) ———122 ;EXECUTION STATEMENT  } EXECUTION STATEMENT
    call Sync_Wait_ref_done() ———123 ;SYNCHRONOUS PROCESSING WAITING ⎫
                                      FOR COMPLETION OF NB_redist    ⎬
    call NB_redist(local_array_ref(q),buf)  124                      ⎬ DATA TRANSFER
                           ;RE-DISTRIBUTE VARIABLE IN LEFT SIDE      ⎭ [S1]~[S4]
                            WHEN q=1-4   (T→A)
    buf=NOT.buf———125      ;SWITCH T1 & T2  } SWITCH TEMPORARY AREA
201 continue ———126
```

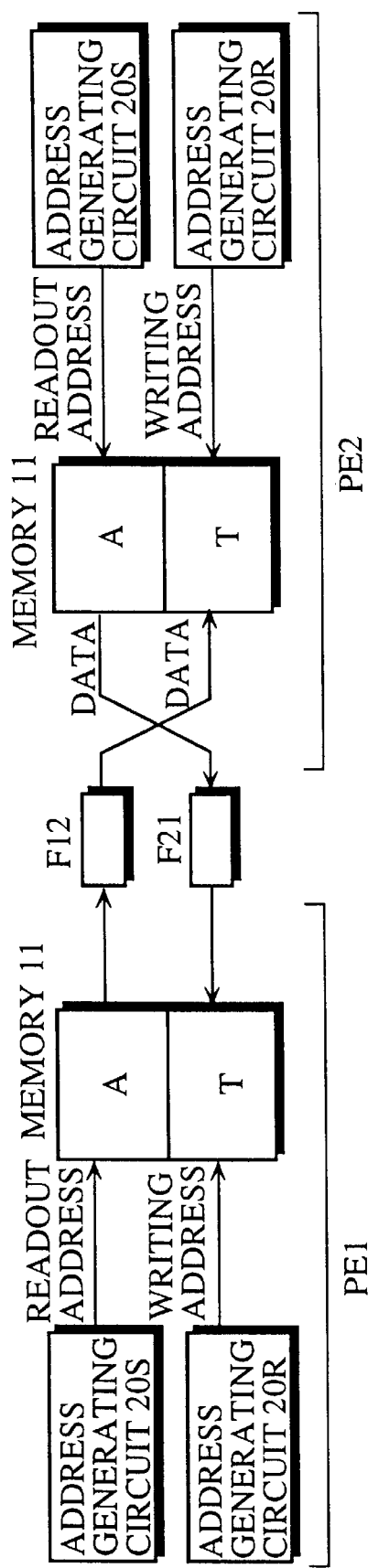
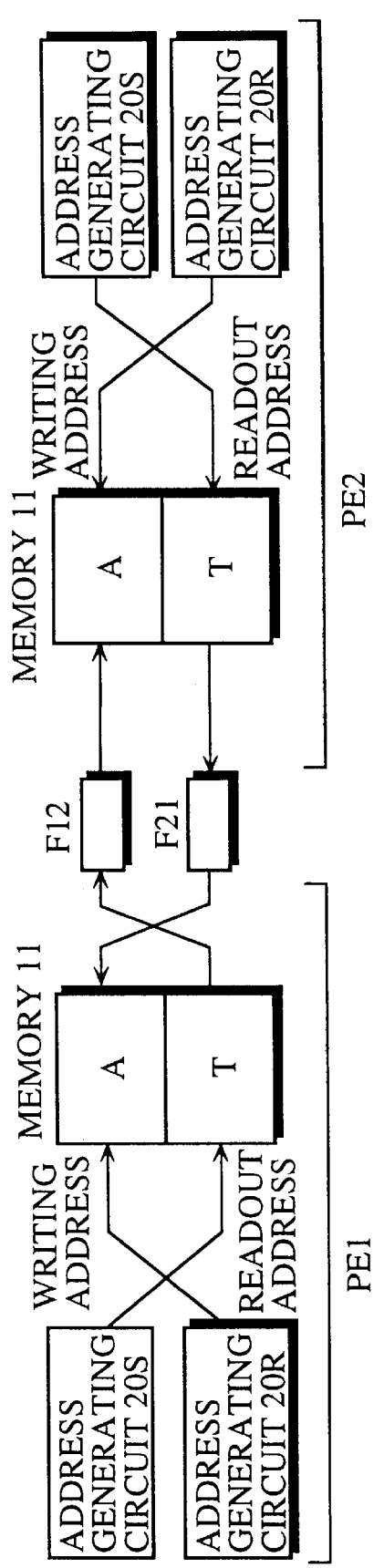
FIGURE 15A
FIGURE 15B

PARALLEL COMPUTER UTILIZING LESS MEMORY BY HAVING FIRST AND SECOND MEMORY AREAS

BACKGROUND OF THE INVENTION (1) Field of the Invention

The present invention relates to a parallel computer that processes data in parallel by transferring partitioned data between a plurality of processor elements.

(2) Description of the Related Art

In recent years, parallel computers, which utilize a plurality of processor elements (PE's) simultaneously, are used for a numerical calculation that involves a massive amount of data to speed up an overall operation.

Of various models being developed, distributed-memory type parallel computers have been put into practical use. This model is suitable particularly for an array calculation. This is because the massive amount of data used in the numerical calculation are generally described by arrays, and this model stores both programs and distributed data (partitioned array) in the PE's to perform a calculation in parallel.

In the array calculation, array data are used repetitively. An array is partitioned into a plurality pieces of array data in the direction of a subscript depending on a program and distributed to the PE's each time the direction changes to be stored into their respective memories. Typical arrays are of 2- or 3- dimension, and array data are allocated to the PE's depending on the direction of partition. Hence, it frequently happens that a program and the array data necessary for that program are not stored in the same PE.

In such a case, or when each PE demands array data partitioned in different directions, the array data are transferred between the PE's. More precisely, each PE sends unnecessary array data to the others while collecting necessary array data from the others via a network interconnecting the PE's. This data transfer enables the PE's to calculate the array partitioned in different directions simultaneously.

Parallel with the advancement of the computers, programming languages have been developed as well. For example, HPF (High Performance Fortran Language) and ADETRAN (ADENART FORTRAN) have been proposed for the above distributed-memory type parallel computers. For further information, see "High Performance Fortran Language Specification Version 1.0", High Performance Fortran Forum, May 1993 and "Parallel Programming Language ADETRAN", Tatsuo Nogi, Memoirs of Faculty of Engineering, Kyoto University Vol. 51, No. 4, 1989.

FIG. 1 shows an example of an ADETRAN program. In this program, the data are processed in parallel with the following: descriptions 60, 61, 62, and 63 related to the array distribution to the PE's, descriptions 64, 65, 66, 70, 71, and 72 related to the execution of the parallel calculation, and descriptions 67, 68, and 69 related to the data transfer. The array data are allocated to the PE's as indicated by slashes, "//". For example, the arrays 60 and 61 are allocated to the PE's in the direction of the second subscript placed between the slashes, and the arrays 62 and 63 in the direction of the first subscript placed between the slashes.

FIG. 2 shows a memory map in the PE's for the arrays 60, 61, 62 and 63 thus allocated. Assume that the size of each array is 4×4 and four PE's are provided. Two-dimensional array data can be distributed linearly in two ways. For example, arrays A(1:4, /1/), B(1:4, /1/), A(/1/, 1:4), and B(/1/, 1:4) are allocated to PE1. When the array size is larger than 4×4, a plurality of blocks of the linear-partitioned array are allocated to one PE.

The array data thus distributed are calculated in parallel as per PDO statements 64 and 70, which direct to process the data partitioned in the direction indicated by the slashes in parallel. Since the distributed-memory type parallel computer is used, the data allocated to the local memory in each PE are calculated. A calculation 66 in the X direction, i.e. the direction of the first subscript, is performed by the PDO statement 64, and a calculation 72 in the Y direction, i.e. the direction of the second subscript, is performed by the PDO statement 70. The calculation by the PDO statement 70 is performed using the result of the calculation by the PDO statement 64. For this reason, the data transfer between the PE's is directed by a PASS statement 67. That is to say, the calculation 72 is performed using the array data after the arrays are re-distributed, and by so doing, the array data can be processed entirely. In case of 2-D arrays, the calculation can be performed using neighboring data along the X and Y directions, and repeating such calculations enables a numerical calculation such that finds status transition across the 2-D area.

The re-distribution of the array data directed by the PASS statement 67 is in actual a communication between the PE's via a network interconnecting the PE's, and a data transferring device furnished with an address generating mechanism is necessary for the communication. A good example would be the hardware described in "VLSI Implementation of a Parallel Computer Network", K. Kaneko et al, IEICE transactions, Vol. E74, No. 11, Nov. 1991, pp3810–3818, which enables the access by the DMA method to the array data on the memory such as those shown in FIG. 2.

However, when a 2-D array is partitioned in two directions as shown in FIG. 2 for parallel processing, the conventional parallel computer demands a memory double the size of the array. Thus, to partition an array by dimension, it is necessary to secure an area as large as arrays multiplied by dimension, meaning that the parallel processing utilizes more memory.

Allocating an array to areas as many as dimension causes a frequent communication between the processors in the parallel computer. This increases frequency of memory access for the data transfer in each PE, and results in a so-called "memory bottle neck" problem.

SUMMARY OF THE INVENTION

The present invention has an object to provide an efficient parallel computer utilizing less memory.

The present invention has another object to provide an efficient parallel computer which can accelerate the data transfer between the PE's.

The above objects can be fulfilled by a parallel computer comprising a plurality of processor elements and a network interconnecting the same, wherein each of the plurality of processor elements includes: a memory unit including a first area and a second area, the first area storing a program and a data portion allocated to the processor element, the second area having a smaller capacity than the first area and storing working data temporarily; a first data transferring unit for performing a first data transfer, whereby data necessary for an operation are transferred to the second area from the first areas of the other processor elements via the network to form a new data portion therein; a processor for performing a first operation, whereby the data portion in the first area is processed as per program and an operation result is restored into the first area, and for performing a second operation, whereby the new data portion in the second area is processed as per program and an operation result is restored into the second area; and a second data transferring unit for performing a second data transfer, whereby the operation results restored in the second areas in the other processor elements are transferred to the first area of the processor element via the network.

According to the above structure, the necessary data are transferred to the second area for each second operation, and stored dynamically while the processor performs the second operation. Since the second area requires a capacity of a part of the data allocated to each PE, the utilized memory can be reduced significantly compared with the conventional parallel computer.

The first area in the memory unit may store at least one data portion for the first operation, the data portion being included in at least one piece of 2- or higher- dimension array data partitioned in a direction of dimension; and the first data transferring unit may transfer the data portions in the first areas of the other processor elements to the second area in the processor element to form a data portion of the array data partitioned in a different direction of dimension.

The processor may repeat the first and second operations as per program using the data portions by activating the first data transferring unit before the second operation and the second data transferring unit after the second operation; the first data transferring unit may perform, while the processor performs one of the first and second operations, the first data transfer using data portions other than the data portion being processed; and the second data transferring unit performs, while the processor may perform one of the first and second operations, the second data transfer using a post-second-operation data portion.

The second area in the memory unit may include a first buffer and a second buffer, the first and second buffers having a same capacity, and when necessary for the operation by the processor, holding some of the data allocated to the first areas of the other processor elements; the first data transferring unit may switch between the first and second buffers as a destination for every first data transfer; the processor may perform, while the first data transferring unit may perform the first data transfer, the second operation using the data portion in the buffer currently not used as the destination; and the second data transferring unit may transfer the data from the buffer storing the operation result of the second operation.

The data portion included in two or more pieces of array data may be allocated to the first area in the memory unit; and the processor may perform, while the first data transferring unit may perform the first data transfer using one piece of the array data, the first operation using the other pieces of array data.

The memory unit may be made of a memory element, and the second area may have a faster access time than the first area.

According to the above structure, the second area, requiring a capacity of a part of the data portion, maintains the same size when the array size becomes quite large, for example, when a plurality of virtual processor elements are multiplexed into one processor element or the data portion of a plurality pieces of array data are allocated to the first area. The effect is significant, in particular, for a parallel processing where 2- or higher- dimension array data partitioned in a direction of dimension need be redistributed/ collected in a different direction of dimension.

In addition, the processor can operate in parallel with the first data transfer (distribution/collection) and second data transfer (re-distribution/re-collection). Thus, the time required for the first and second data transfer can be concealed in the time required for the operation by the processor, accelerating an overall speed for the parallel processing.

Further, by providing the first and second buffers in the second area, the first data transfer and second data transfer can be performed separately, which further accelerates the processing speed. The data can be transferred faster when the second area has the access time faster than the first area.

The first area of the memory unit may be a 1-port memory, and the second area thereof may be a 2-port memory. The one port of the 2-port memory, the 1-port memory, processor, and the data transferring unit may be connected to a first bus, and the other port of the 2-port memory and the data transferring unit may be connected to a second bus.

According to the above structure, the contention in memory access for the first data transfer (distribution/ collection) and second data transfer (redistribution/re-collection) can be reduced, enabling faster data transfer.

Each PE may comprise a processor, a data transferring unit, n buses connecting the processor and data transferring unit, n memory units connected to the n buses, respectively.

According to the above structure, when n data portions as a result of a partition of n-D array data are allocated to the first areas of the n memory units, there will be no contention in the memory access for the first operation in one direction and the second operation in another direction. Consequently, the processor can access the memory while the data transferring unit accesses the memory, enabling the parallel computer to operate faster.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 1 shows an example of a conventional program;

FIG. 2 shows a memory map used conventionally;

FIG. 8 shows an example of a source program run by the parallel computer in the first embodiment;

FIG. 9 shows an example of an object program run by the parallel computer in the first embodiment;

FIG. 15A is a view explaining the data transfer when an array is re-partitioned (distributed, collected);

FIG. 15B is a view explaining the data transfer when an array is re-partitioned (re-distributed, re-collected);

DESCRIPTION OF THE PREFERRED EMBODIMENTS

Figure 5:
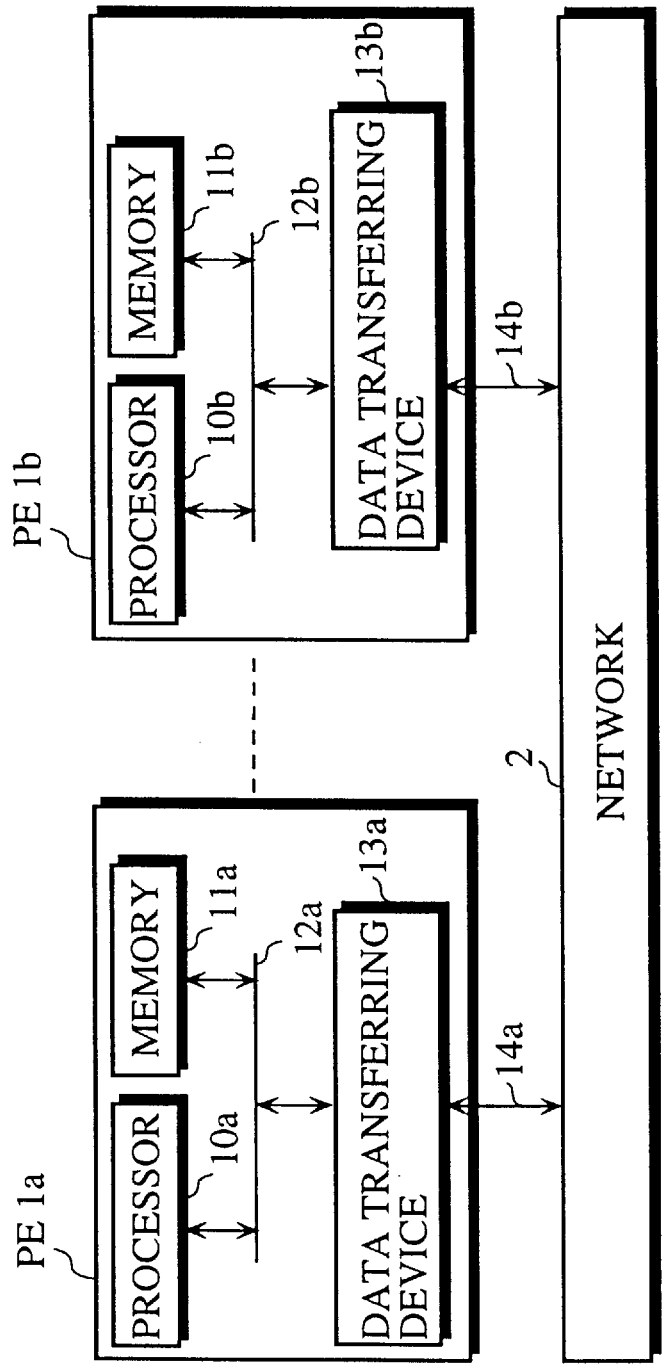
FIG. 5 is a view depicting a structure of a parallel computer in the first embodiment.

FIG. 5 is a block diagram depicting the structure of a parallel computer in accordance with the first embodiment of the present invention. As shown in the drawing, the parallel computer comprises a plurality of PE's 1a–1b and a network 2 interconnecting the same. Only two PE's 1a and 1b are shown in the drawing for the explanation's convenience; however, the number of the PE's is not limited to two and any number (e.g. 4, 16, 128 . . . ) of PE's can be provided. Note that all the PE's are of one structure. In this embodiment, assume that four PE1's are provided.

Each PE1 comprises a processor 10, a memory 11, and a data transferring device 13, all of which are interconnected by a bus 12.

The processor 10 executes a program in the memory 11.

The memory 11 stores programs executed by the processor 10 and the data necessary for the execution. The data stored in the memory 11 include a data area and a temporary memory area (work area). The data partitioned for a program and allocated to the PE's are stored in the data area, and some of the data allocated to the other PE's are stored temporarily in the temporary memory area.

The data transferring device 13 is connected to the bus 12, and to the network 2 via an I/O port 14 to allow the data transfer between the memory 11 and network 2.

The bus 12 includes an address bus, a data bus, and a control signal. The control signal includes an arbitral signal for the bus 12 connecting the processor 10 and data transferring device 13, a control signal for the memory 11, and an interrupt signal to the processor 10 from the data transferring device 13.

Figure 6A:
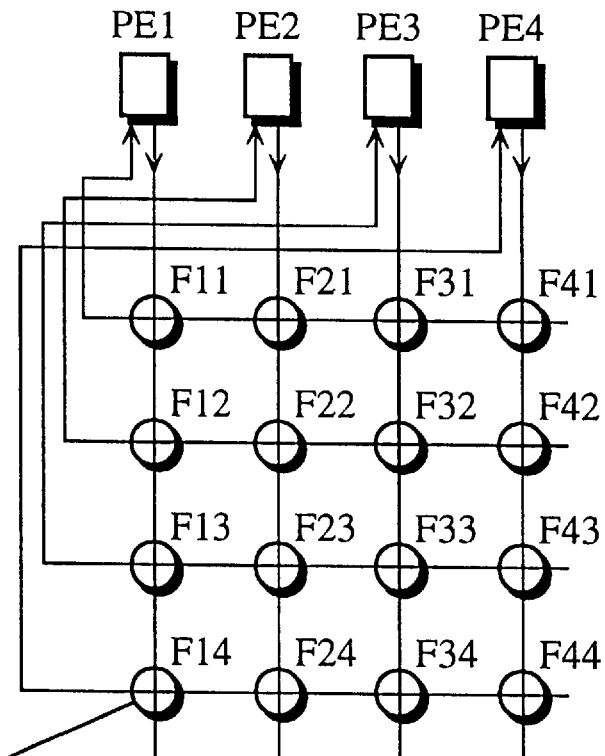
FIGS. 6A and 6B are a view depicting a structure of a network in the first embodiment.
Figure 6B:
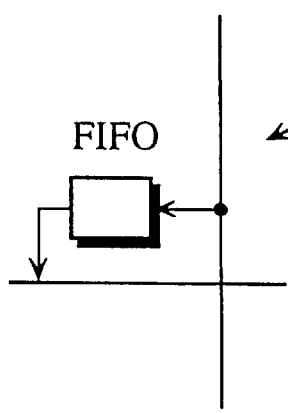

FIGS. 6A and 6B show the structure of the network 2 shown in FIG. 5. As shown in the drawing, each of the PE's 1–4 is connected to a sending line and a receiving line.

F11–44 denote FIFO memories provided at the intersections of the grid of the sending and receiving lines. The input data from the sending line are withheld temporarily and outputted later to the receiving line. That is to say, each FIFO memory serves as a buffer that withholds transferred data temporarily when the data are transferred between the PE's. For example, the data are transferred to PE2 from PE1 in two steps: from PE1 to FIFO memory F12 and from FIFO memory F12 to PE2. Similarly, the data are transferred to PE1 from PE2 in two steps: from PE2 to FIFO memory F21 and from FIFO memory F21 to PE1.

Figure 3:
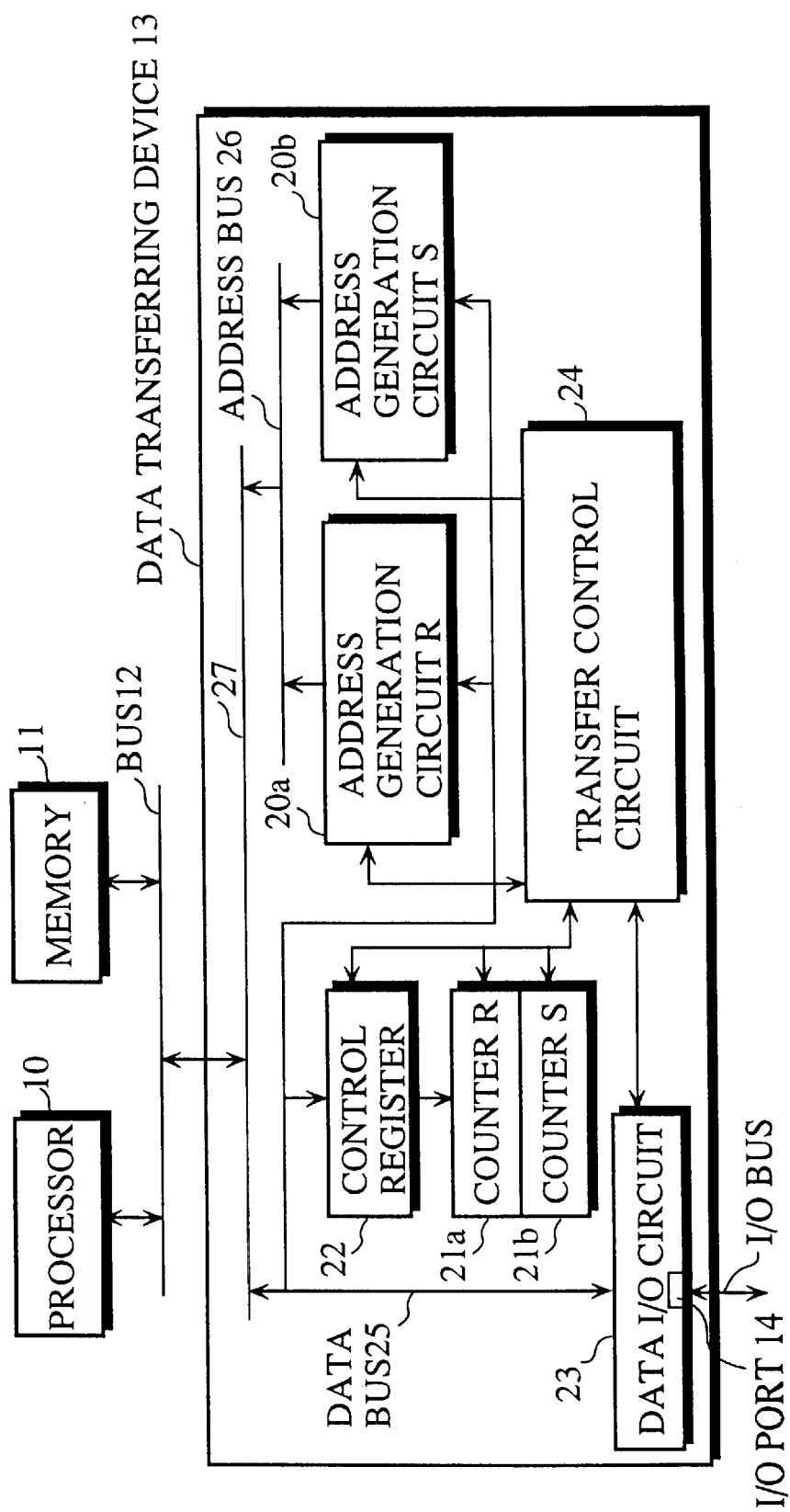
FIG. 3 is a view depicting a structure of a PE in accordance with a first embodiment of the present invention.

FIG. 3 is a block diagram depicting the structure of the data transferring device 13 installed in the PE1 in FIG. 5.

The data transferring device 13 comprises an address generating circuit R20a, an address generating circuit S20b, a counter R21a, a counter S21b, a control register 22, a data I/O circuit 23, and a transfer control circuit 24, all of which are interconnected by a data bus 25 and an address bus 26. The data bus 25, address bus 26, and control signals such as interrupt signals are integrated into an internal bus 27 to be connected to the bus 12 within the PE1.

The address generating circuits R20a and S20b are of the same structure and generate the addresses on the memory 11 in the PE1 when transferring the data. Two circuits are provided to separately control the data transferred in two directions. One is used to transfer the data from the FIFO memory to the PE, and the other is used to transfer the data from the PE to the FIFO memory. In this embodiment, assume that the address generating circuit R20a generates writing addresses on the memory 11 when the PE receives the data from the FIFO memory, and the address generating circuit S20b generates readout addresses on the memory 11 when the PE sends the data to the FIFO memory.

The counter R21a counts the number of times of the data transfer by the address generating circuit R20a. The initial value is set by the processor 10 and the data are transferred until the counter R21a counts up to a predetermined value (for example, until it counts down to zero from the initial value.)

The counter S21b counts the number of times of the data transfer by the address generating circuit S20b in the same manner as the counter R21a.

The control register 22 holds a variety of parameters to control the data transfer. The parameters include fields that specify a data size, status, and a data transfer mode. The data size shows a size of the data to be transferred. The status includes a flag that indicates the execution or completion of the data transfer, and a 2-bit flag (start flag) that indicates the start of the data transfer. A mode bit specifies the direction of the data transfer by indicating whether an address is the writing address or readout address generated by the address generating circuits R20a or S20b.

The data I/O circuit 23 inputs and outputs the data through the sending and receiving lines of the network 2 and the data bus 25. The I/O port 14 in the data I/O circuit 23 is connected to the sending and receiving lines of the network 2.

The transfer control circuit 24 controls the data transfer using the contents in the control register 22 and counters R21a and S21b. To be more specific, when the processor 10 sets the start flag, the transfer control circuit initiates the address generating circuits R20a and S20b to generate the addresses on the memory 11 to allow the data transfer between the memory 11 and I/O port 14 by the data I/O circuit 23. The transfer control circuit 24 controls two kinds of data transfer separately: one is the data transfer using the address generating circuit R20a and counter R21a, and the other is the data transfer using the address generating circuit S20*b* and counter S21*b*. The former is activated when the processor 10 sets the start flag FS, and the latter is activated when the processor 10 sets the start flag FR.

Figure 4:
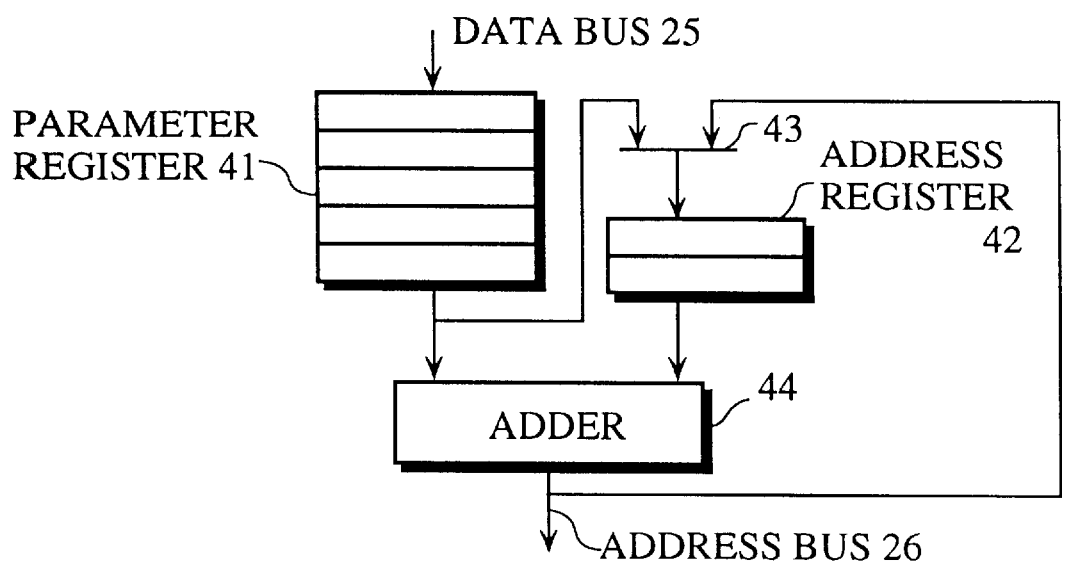
FIG. 4 is a view depicting a structure of an address generating circuit in the first embodiment.

FIG. 4 is a view depicting the structure of the address generating circuits R20*a* and S20*b* in the data transferring device 13 shown in FIG. 3. Two address generating circuits are of the same structure, and each comprises a parameter register 41, an address register 42, a selector 43 and an adder 44.

The parameter register 41 holds parameters used to generate the addresses. The parameters, including the base addresses of the arrays to be transferred and an increment, are set by the processor 10 via the data bus 25.

The base address is selected by the selector 43 from the parameter register 41 and set in the address register 42. The value in the address register 42 is added to the increment in the parameter register 41 by the adder 44. The adder 44 outputs the adding result to the address bus 26 as an address on the memory 11. The adding result in the address bus 26 is selected by the selector 43 and set in the address register 42 again, readily updating the value therein.

Figure 7:
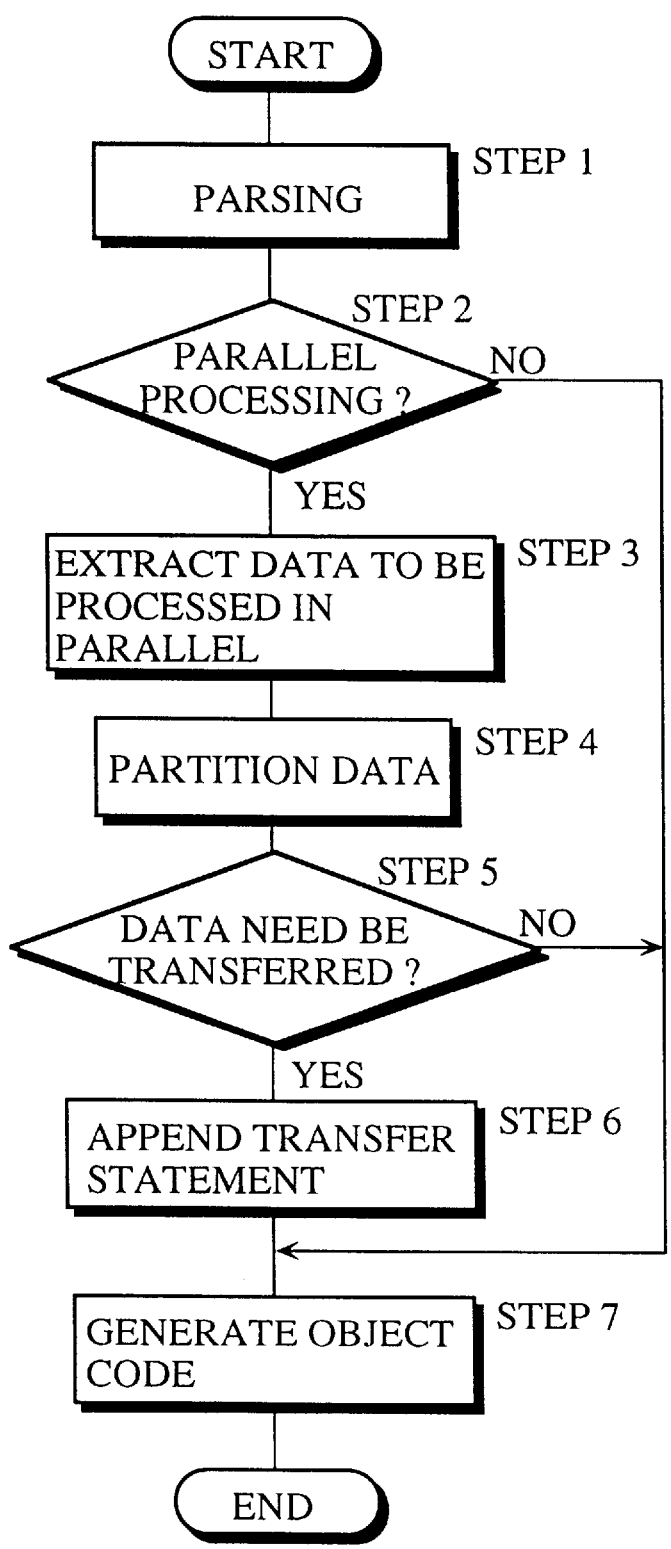
FIG. 7 shows a flowchart detailing the operation of a compiler furnished with the parallel computer in the first embodiment.

FIG. 7 is a flowchart detailing the operation of a compiler that converts a source program for parallel calculation into an object code.

The compiler parses the source program to convert the same into an intermediate language first (Step 1), and then partitions the data necessary for a program portion to be run in parallel in a matching number with that of the PE's (Steps 2–4). Steps thus far are carried out in the same manner as the conventional compiler, and the detailed explanation is given in "Compiler" Ikuo Nakata, Sangyo Tosho, and "Advanced Compiler Optimizations for Supercomputers", David A. Padua, Communication of the ACM, Dec. 1986, Vol. 29, No. 12.

The compiler checks whether the data need be transferred for the program portion to be run in parallel (Step 5). To be more specific, when the distribution direction indicated by the slashes in the program portion extracted in Step 3 does not match with the direction of partition in Step 4, the compiler judges that the data need be transferred.

When the data need be transferred, a data transfer statement to re-partition the array is appended at the top and end of the extracted program (Step 6). To be more specific, the compiler distinguishes the data necessary to run the extracted program portion in parallel using a variable placed between the slashes, and appends a data transfer statement to collect the necessary data at the top of the program portion, and a data transfer statement to restore the calculation result at the end thereof. Here, the data transfer statement appended at the top directs the data transferring devices 13 to collect (transfer to the temporary area in the memory of its own PE1) the data necessary to run the program portion from those partitioned in Step 4 (the data allocated to the data areas in the memories 11 of the other PE1's). The data appended at the end directs the data transferring devices 13 to restore (transfer to the data area in the memory 11 of the original PE1) the execution result (the data in the temporary memory area in the memory 11 of its own PE1) to its original area when necessary. The data transfer statements thus appended set the parameters in the control register 22 and address generating circuit R20*a* of the data transferring device 13 shown in FIG. 3. The data transferring device 13 can transfer the data separately once the parameters are set, and thus it can transfer the data while the processor 10 performs the calculation.

The compiler generates the object code based on the intermediate language appended with the data transfer statements (Step 7). The object code is generated in the same manner as the conventional compiler ("Advanced Computer Optimizations for Supercomputers") and the explanation is omitted.

The data allocation to four PE1's and the parallel processing by the above-constructed parallel computer of this embodiment will be explained.

FIG. 8 shows an example of a source program for 16x16 array data. The source program is a FORTRAN program for parallel processing.

The subscripts placed between the slashes in the arrays A and B in DIMENSION statements 50 and 51 direct to partition the arrays in the direction of the subscripts and to allocate the partitioned arrays to the memories 11 of a plurality of PE1's. Given the array size of 16x16, each array is partitioned into sixteen array data in the direction of the second subscript and allocated to sixteen PE's, respectively. The array partition on the program can be directed independently of the actual number (four herein) of the PE1's, and the PE's on the program are referred to as virtual PE's. Sixteen virtual PE's are provided herein.

A PDO statement 52 directs the PE's to execute the program portion from the PDO statement 52 to a PEND statement in parallel in the direction of the specified subscript. Given PDO J=1, 16, the PDO statement directs the sixteen virtual PE's to execute the program portions 53 and 54 in parallel in the direction of the second subscript J.

A PDO statement 55 directs the sixteen virtual PE's to execute the program portions 56 and 57 in parallel in the direction of the first subscript I.

FIG. 9 is a view explaining the object code converted from the source program shown in FIG. 8. The resulting object code should be a program written in a machine language instruction to be stored in each memory 11; however, it is written in the format of the source program for the explanation's convenience.

DIMENSION statements 111 and 112 in FIG. 9 are described in the same manner as the DIMENSION 50 and 51 in FIG. 8, respectively, but they include a direction to allocate the data partitioned in Step 4 to each PE to be stored. That is to say, the arrays A and B are partitioned in the direction specified by the slashes and stored in the memory 11 of each PE1.

Figure 10:
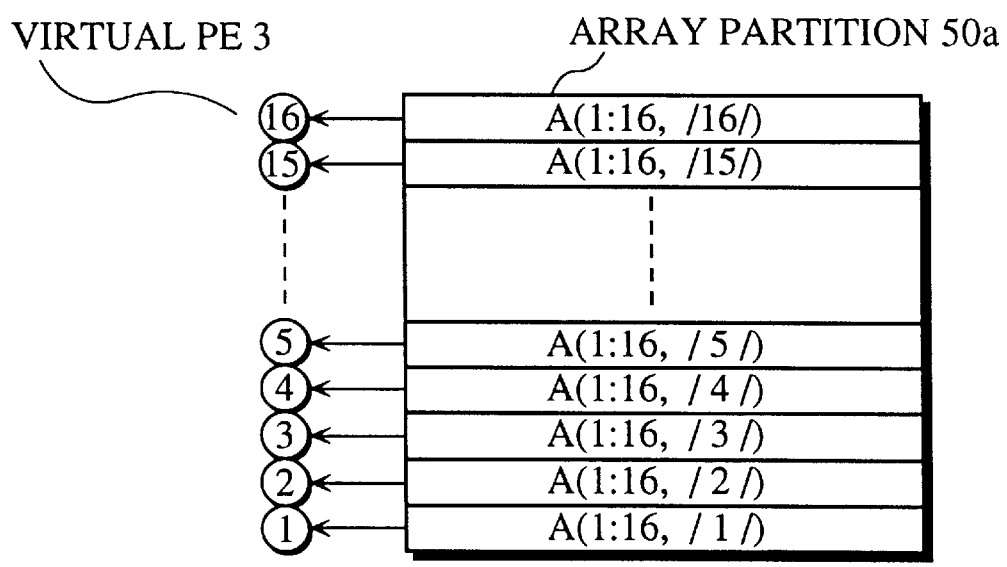
FIG. 10 shows data allocation to virtual PE's in the first embodiment.

FIG. 10 shows when the array data A (1:16, /1:16) in the DIMENSION statement 111 in FIG. 9 is partitioned, and a correlation between the partitioned data and sixteen virtual PE's. As indicated by the array partition 50*a*, the 2-D array A is partitioned in the direction of the second subscript specified by the slashes, and the resulting linear arrays are respectively allocated to the virtual PE's in the X direction, i.e., the direction of the first subscript. Given four PE1's, each PE1 is responsible for four virtual PE3's.

Statements 113–115, and 117–119 in FIG. 9 control multi-allocation of the sixteen virtual PE's to four PE's.

Figure 11:
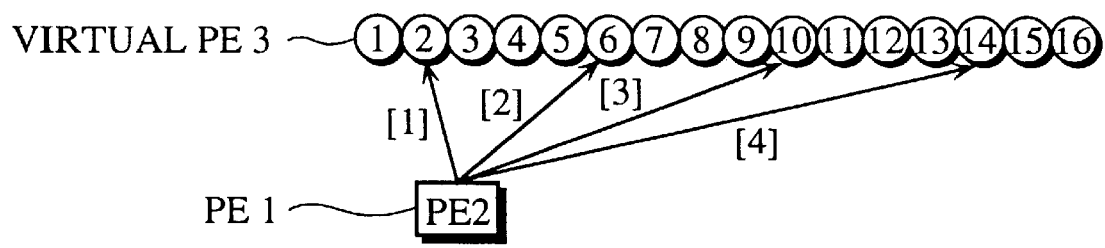
FIG. 11 shows multi-allocation of the virtual PE's to the PE's in the first embodiment.

FIG. 11 is a view explaining the multi-allocation of the virtual PE3's to PE2. As is shown in the drawing, the PE2 is responsible for the virtual PE3-2, PE3-6, PE3-10, and PE3-14. The processing by the virtual PE's assigned for one PE1 is indicated by [n], where n=1–4, and a set of [1], [2], [3], and [4] indicates that four virtual PE3's are multiplexed into one PE. One PE performs the processing by the virtual PE3's by executing the multi-count n, where n=1 to 4.

Figure 12:
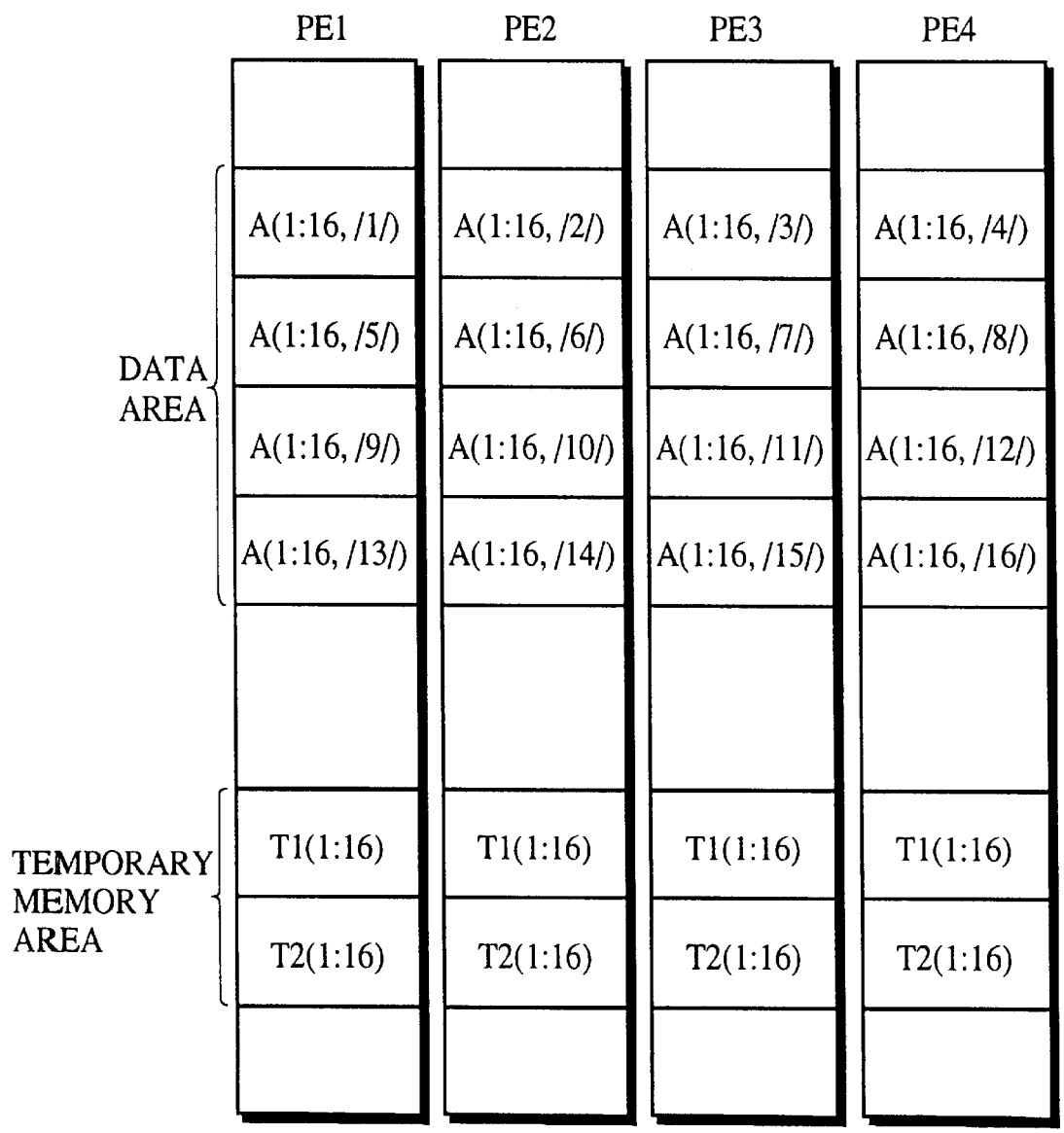
FIG. 12 shows a memory map of the PE's in the first embodiment.

FIG. 12 shows a memory map for each PE when the arrays are partitioned and the virtual PE3's are multi-allocated. For example, 16×4 data, A(1:16, /2/), A(1:16, /6/), A(1:16, /10/), A(1:16, /14/), are distributed to the PE2.

Note that, according to the memory map, the array data are processed differently by the PDO statements 52 and 55 in the program in FIG. 8.

To be more concrete, the PDO statement 52 directs a parallel processing in the direction of the second subscript J. That is to say, it directs the processing of the linear arrays in the X direction allocated to the memory 11. The memory map in FIG. 12 shows that the memory 11 in each PE1 stores the linear array data in the X direction, which are necessary for the PDO statement 52, and thus the data need not be transferred between the PE1's.

Numeral 116 (pdo_body1( )) in FIG. 9 is the object code for the execution statements 53 and 54 directed by the PDO statement 52. Since the data need not be transferred for the execution of pdo_body1( )116, each PE performs calculation using the arrays A and B partitioned as shown in FIG. 12.

Whereas the PDO statement 55 directs a parallel processing in the direction of the first subscript I. That is to say, it directs the processing in the Y direction, which is different from the X direction allocated to the memory 11. The memory map in FIG. 12 shows that the linear array data in the Y direction, which are necessary for the PDO statement 55, are distributed to the memory 11 in each PE1, and thus the data need be transferred between the PE1's. For this reason, in executing the PDO statement 55, the array partitioned as shown in FIG. 10 need be re-partitioned.

Numeral 122 (pdo_body2( )) in FIG. 9 is the object code for the execution statements 56 and 57 directed by the PDO statement 55. Since the data need be transferred for the execution of pdo_body2( )122, the compiler appends the data transfer statements 120 and 121 at the top thereof and the data transfer statements 123 and 124 at the end as shown in FIG. 9 (Step 6 in FIG. 7).

How the array data distributed to the PE's are repartitioned by the data transfer statements 120 and 121 in FIG. 9 will be explained.

Figure 13:
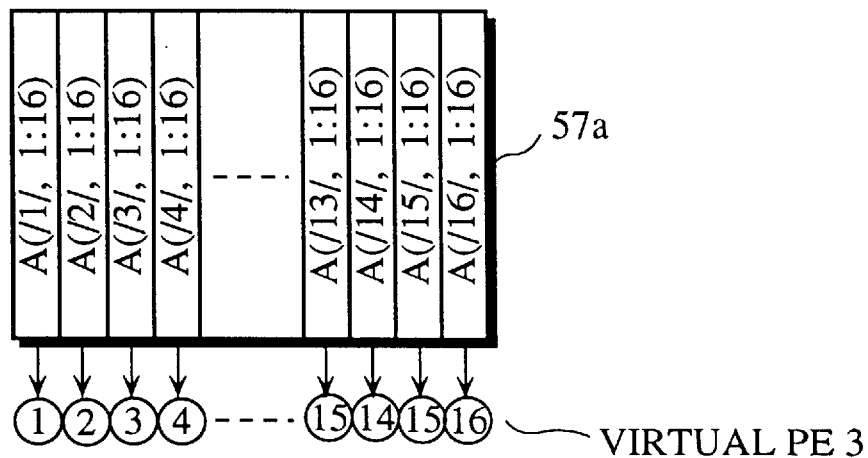
FIG. 13 shows multi-allocation of the virtual PE's to the PE's in the first embodiment.

The array data need be partitioned in the direction of the first subscript I for pdo_body2( )122. FIG. 13 shows the array partition 57a for Equation 57 and the allocation to the virtual PE3's. As is shown in the drawing, the array A is partitioned into sixteen linear arrays in the Y direction, i.e., the direction of the second subscript, which are allocated to the virtual PE3's, respectively. Here, sixteen virtual PE3's are provided and four PE3's are multiplexed into one PE1. For example, 16×4 data, A(/2/, 1:16), A(/6/, 1:16), A(/10/, 1:16), A(/14/, 1:16), are allocated to the temporary memory area of the PE2. The partition data in FIG. 13 are stored as an array T1 or T2 in the temporary memory area in the memory 11 of each PE shown in FIG. 12 by the data transfer statements 120 and 121. In other words, the arrays A shown in the memory map in FIG. 12 are mutually transferred between the PE1's to be re-allocated to the temporary memory areas as shown in FIG. 13.

Figure 14:
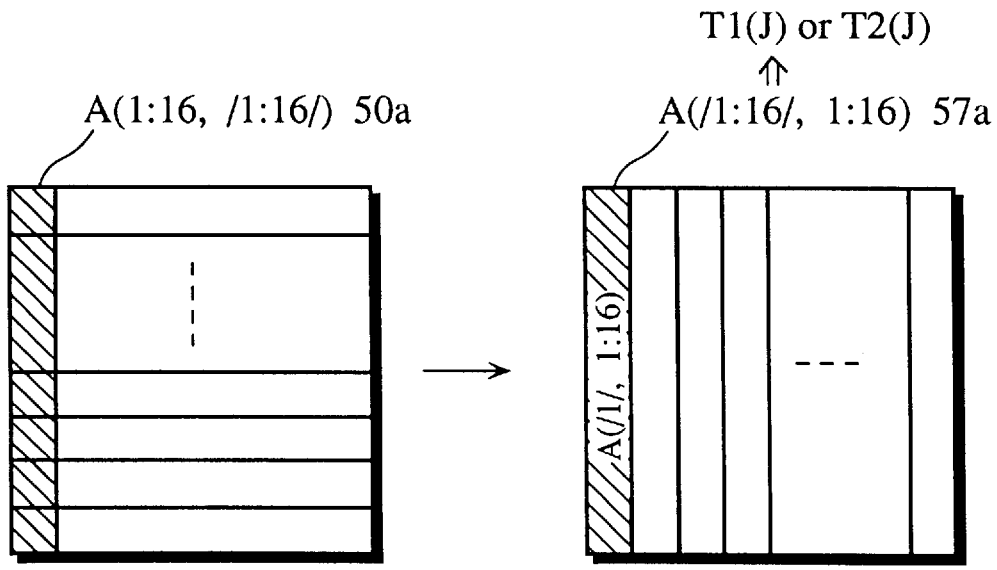
FIG. 14 shows data re-allocation to the PE's using two partitioning methods.

FIG. 14 shows the array partition 50a allocated to the memory and the re-partition of the array 57a to be calculated. The array A(/1/, 1:16) is the data necessary for the first virtual PE1 to perform a calculation after the re-partitioning, which is denoted by the shade in the array 57a. The data correspond to the allocation in the array 50a indicated by the shade, which are distributed to the data areas in the memories 11 of the four PExs. For example, in the data area of the memory 11 of the PE2, the data for four virtual PE3's, A(1, /2/), A(1, /6/), A(1, /10/), A(1, /14/) are allocated. The data held in each of the four PE1's are collected in the temporary memory area on the memory 11 of the PE1 to change the direction of partition. Similarly, the direction of partition of the array can be changed for the other virtual PE's by transferring the data allocated to the other PE1's.

Next, how the addresses are generated when the data are transferred between the PE's by the data transfer statements 120 and 121 to re-partition the array as shown in FIG. 14 will be explained.

The array 57a used in Equation 57 in the PDO statement 55 is allocated to the temporary areas T1 and T2 on the memory shown in FIG. 12. The array can be re-partitioned by transferring the data from the data area in one PE to the temporary areas T1 and T2 of another PE. The temporary area T1 and T2 are sufficiently large to store the array in linear length. Four virtual PE's are multiplexed into one PE and two temporary areas are secured, so that T1 and T2 are selectively used for each virtual PE. The statement 125 in FIG. 9 directs the selection of T1 and T2.

The address generating circuits R20a and S20b of the data transferring device 13 in each PE generate addresses for the arrays allocated as shown in FIG. 12 using the base address and increment in accordance with the data transfer statements 120 and 121. FIG. 15A shows the data transfer between the PE1 and PE2.

For example, the array data A(1, /2/) in the PE2 are transferred to the PE1 in two steps: from the PE2 to the F21 and from the F21 to the PE1. To be more specific, in the first step, the array data A (1,/2/) are readout from the data area in the memory 11 using the readout address generated by the address generating circuit S20b of the data transferring device 13 in the PE2, which are further transferred to the F21 via the data I/O circuit 23. In the second step, the array data A(1, /2/) from the F21 via the data I/O circuit 23 are written into the temporary memory area as data T1(1) using the writing address generated by the address generating circuit R20a. The data transferring device 13 stops the memory control means each time the data in a size of the partition data (16 array elements herein) of the control register 22 are processed to notify the processor of the completion of the data transfer. The data size is counted by the counter R21a. The completion is notified by causing an interruption to the processor when the transfer control circuit. stops based on the value in the control register 22, or by checking the status of the transfer in the control register 22 by the processor.

Similarly, the array data as a result of the repartition are collected to the temporary memory area from the other PE's. Consequently, the array data A(/I/, J) are stored as T1(J) or T2(J) into the temporary memory area in the memory 11 of each PE.

In the following, the calculation and data transfer will be explained more in detail.

While the array data are stored in the temporary area in each PE, the calculation is executed as soon as the data necessary for pdo_body2( )122 in FIG. 9 are collected. The processor 10 checks whether all the necessary data are collected by the notice of data transfer completion. After receiving the notice, the processor 10 reads out the array data A(/I/, J) to execute the calculation. The access to the array data A(/I/, J) (refer to the PDO statement 55) is the access to T1(J) or T2(J) in actual. The result of the calculation (a value substituted into Equation 57) is written into the temporary areas T1 and T2.

Further, parallel with the calculation by pdo_body2( )122, the calculation result data in the temporary area are transferred to be restored in the original data area. FIG. 15B shows a view explaining the data transfer to restore the calculation result between the PE1 and PE2. For example, T1(1) in the PE1 is restored to A(1, /2/) in the PE2 by the 2-step data transfer: from the PE1 to the F12 and from the F12 to the PE2. To be more specific, in the first step, the data T(1) are read out from the temporary memory area in the memory 11 using the readout address generated by the address generating circuit S20b of the data transferring device 13 in the PE1, which are transferred to the F12 via the data I/O circuit 23. In the second step, the data T1(1) from the F12 via the data I/O circuit 23 are written into the data area as the array data A(1,/2/) using the writing address generated by the address generating circuit R20a in the PE2.

Similarly, the array data as a result of the calculation are collected again from the temporary memory areas to the data area from the other PE's. Consequently, the calculation result A(I,/J/) is stored in the data area in the memory 11 of each PE.

Although it is omitted in the memory map in FIG. 12, the array B is partitioned in the direction of the second subscript and the resulting linear arrays in the X direction are multi-allocated in the same manner, and the array B in Equation 57 is allocated to temporary areas T1' and T2' (unillustrated). Note that since the array B in Equation 57 is only referred to and no value is substituted, the data need not be restored to the array B from the temporary areas T1' and T2'.

Figure 16:
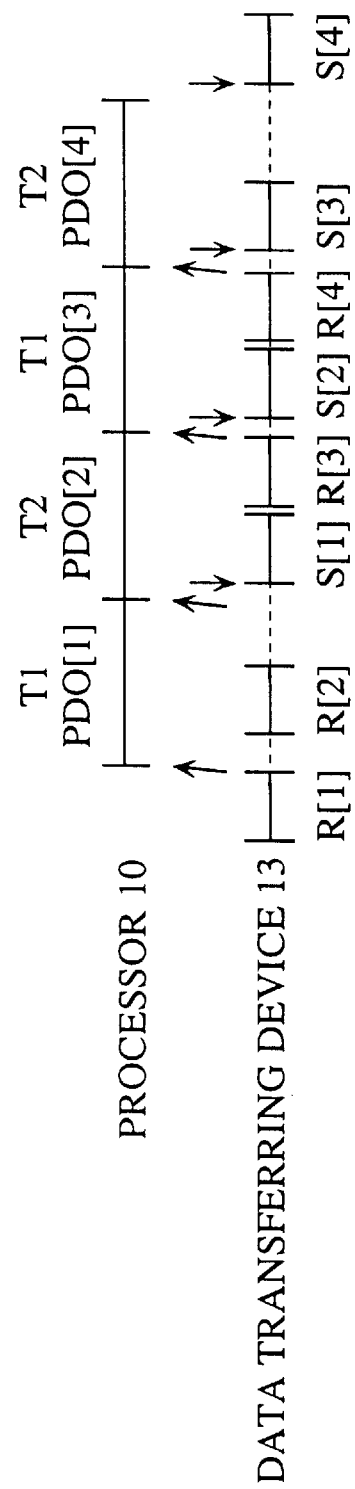
FIG. 16 shows the sequence of the operation by a processor and the data transfer by a data transferring device in the first embodiment.

FIG. 16 shows the sequence of the calculation by the processor 10 and the data transfer by the data transferring device 13. The horizontal axis shows the time.

The data transfer before the execution statement, i.e. the data transfer from the data area to the temporary memory area (the data transfer from A to T1 or T2 as shown in FIG. 15A) is indicated by a capital letter R, and the data transfer after the execution statement, i.e. the data transfer from the temporary memory area to the data area (the data transfer from T1 or T2 to A as shown in FIG. 15B) is indicated by a capital letter S. As has been explained, to process the multi-allocated linear arrays for the multi-allocated virtual PE3's, one PE executes the data transfer R and S from [1] to [4], respectively.

When the data transfer R[n] to the temporary area T1 and T2 by the data transferring device 13 ends, the processor 10 starts the calculation using the transferred data. When the processor 10 ends the calculation, the data transferring device 13 is activated to perform the data transfer S[n]. The data transfer from the processor 10 to the data transferring device 13 is activated when the control register 22 is set and the transfer control circuit 24 is activated.

The data transfer from the processor 10 is activated in two ways. One is the data transfer R[n] and the other is the data transfer S[n] followed by R[n+2]. To activate the data transfer by the secondly mentioned transfer, the transfer control circuit 24 interrupts to the processor 10 to switch to S from R, or processes R continuously after S.

To begin with, the data transfer R[1] is activated (the data transfer statement 120 in FIG. 9), and subsequently a process PDO [1] for the first virtual PE is executed (the execution statement 122). When entering into the PDO [1], the data transfer R[2] is activated to collect the data necessary for the processing by the next virtual PE (the data transfer statement 121). When entering into a process PDO [2] for the next virtual PE, the data transfer S[1] is activated to restore the processing result (the data transfer statements 123 and 124). Here, do loop is executed by the data transfer statement 123 after the data transfer statement 121 is completed to execute the execution statement 122 in the next do loop correctly. The data transferring device 13 executes the data transfer R[3] for a processing PDO[3] for the next virtual PE after the data transfer S[1] is completed (the data transfer statement 121). By executing the above processing, the calculation by the processor 10 and the data transfer by the data transferring device 13 are carried out in parallel as shown in FIG. 16. No data transfer R is activated after a final process PDO[4] for the virtual PE, and the preceding process PDO [3].

The data transfer R[1] to R[4] are performed for the array B in the same manner. Since the array B is only referred to in the PDO statements and no value is updated, the data need not be restored to the original memory area and the data transfer S is not necessary.

Arrays of 3- or higher- dimension are partitioned into linear arrays by dimension in the same manner, and processing and transferring the resulting partitioned data in parallel enables efficient parallel processing.

All the arrays may be transferred to the temporary area first, and then the processor may perform calculation to restore the resulting data to the original memory area without multi-allocation assuming that a value 1 is given to the multi-count.

The data transfer and calculation may be repeated for a plurality of arrays instead of multiplexing. In this case, the data are transferred per array by the data transfer R and S while the calculation is performed by the PE's.

As has been explained, the memory 11 in each PE only has to secure the data area for storing the data partitioned in one direction, and the temporary memory area with a capacity for the array data partitioned in one direction, the amount of utilized memory can be reduced. If the array size expands and the number of the virtual PE's multiplexed into one PE increases, the temporary area only has to secure an area of a length in one dimension for each variable. The amount of the utilized memory is reduced to one third for a 3-D array and half for a 2-D array while the arrays are partitioned and allocated by dimension.

The data are readily transferred as the addresses are generated, and there will be no waiting time inherent in a system where a response is required for message transmission or data request. As shown in FIG. 16, the calculation and data transfer are performed in parallel. Thus, most of the time required for the data transfer can be concealed by the time required for calculation, which enables efficient parallel processing. The number of the virtual PE's multiplexed into one PE is proportional to the data size to be processed, and so is the concealment effect.

SECOND EMBODIMENT

Figure 17:
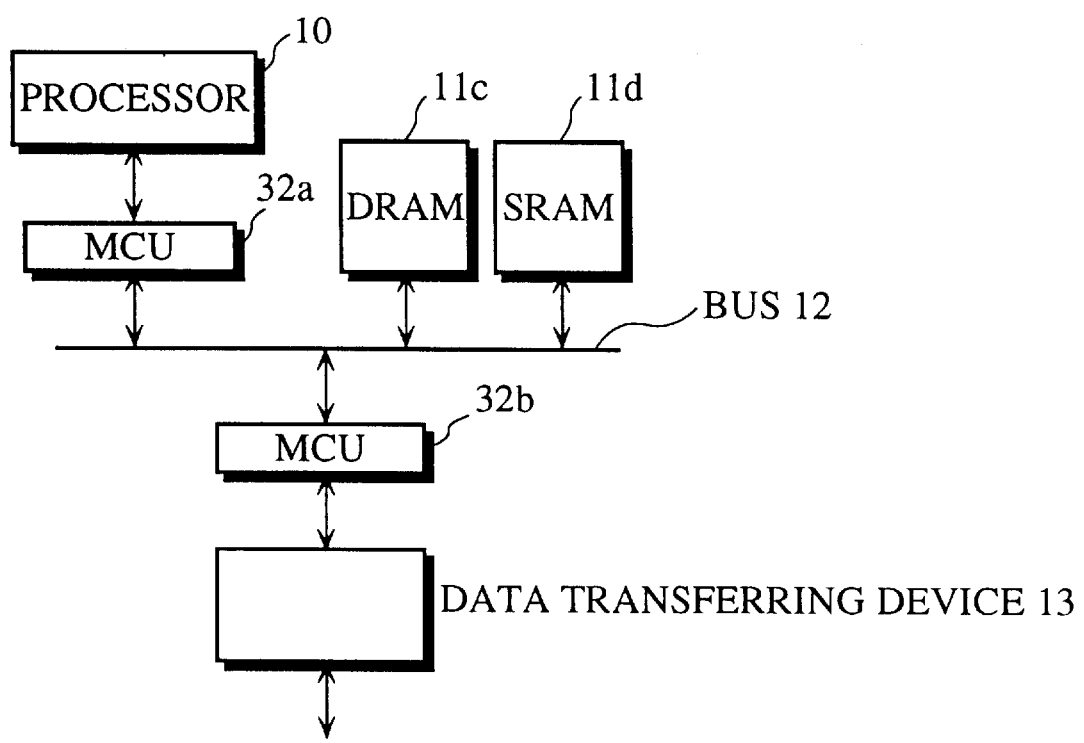
FIG. 17 shows a structure of a PE in accordance with a second embodiment of the present invention.

FIG. 17 is a view depicting the structure of a PE in accordance with the second embodiment of the present invention. The PE comprises a processor 10, an MCU (memory control unit) 32a, a data transferring device 13, an MCU 32b, a DRAM 11c, and an SRAM 11d. The MCU 32a, MCU 32b, DRAM 11c, and SRAM 11d are connected to a bus 12. The memory 11 in the first embodiment is replaced with the DRAM 11c and SRAM 11d. Like components are labeled with like numerals with respect to the first embodiment and the explanation thereof is not repeated.

The SRAM 11d and DRAM 11c are memories, and the former can access the data faster than the latter. The SRAM lid and DRAM 11c serve as the memory 11 in the first embodiment, and they are mapped on linear address spaces, respectively. The DRAM 11c corresponds to the data area in the first embodiment and stores the data partitioned to the PE's, while the SRAM 11d corresponds to the temporary memory area in the first embodiment and is used as a work area.

The MCU 32a controls the access time depending whether the processor 10 accesses the DRAM 11c or SRAM 11d.

Similarly, the MCU 32b controls the access from the data transferring device 13. Hereinafter, the MCU 32a and MCU 32b are simply referred to as MCU 32 when the explanation applies to either of them.

Figure 18:
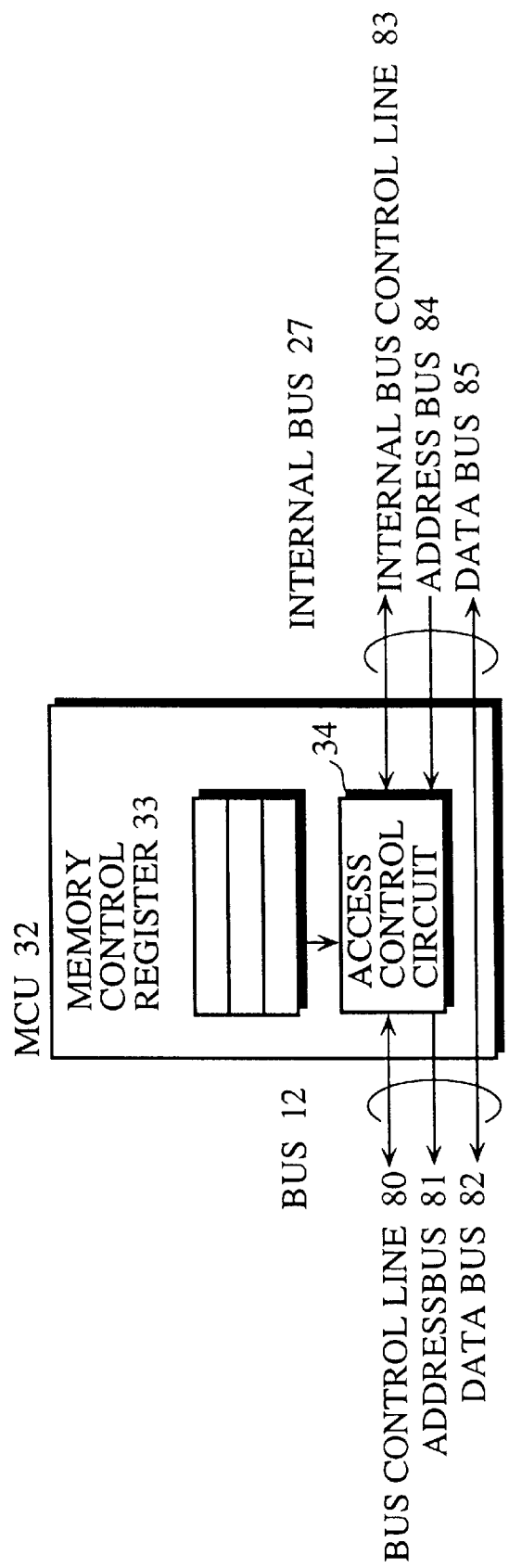
FIG. 18 is a view depicting a structure of a memory control unit in the second embodiment.

FIG. 18 is a view depicting the structure of the MCU 32. The MCU 32 comprises a memory control register 33 and an access control circuit 34. In the drawing, an internal bus 27 includes an internal bus control line 83, an address bus 84, and a data bus 85.

The memory control register 33 holds address spaces and cycle times for the DRAM 11c and SRAM 11d, respectively.

The access control circuit 34 checks whether the address in the address bus 84 is in the address space for the DRAM 11c or SRAM 11d upon receipt of a memory access request from the processor 10 or data transferring device 13 via the internal bus 27, and controls the access in an adequate cycle time for the judged address space.

The parallel processing operation of the above-constructed parallel computer will be explained while referring to the programs shown in FIGS. 8 and 9.

Figure 19:
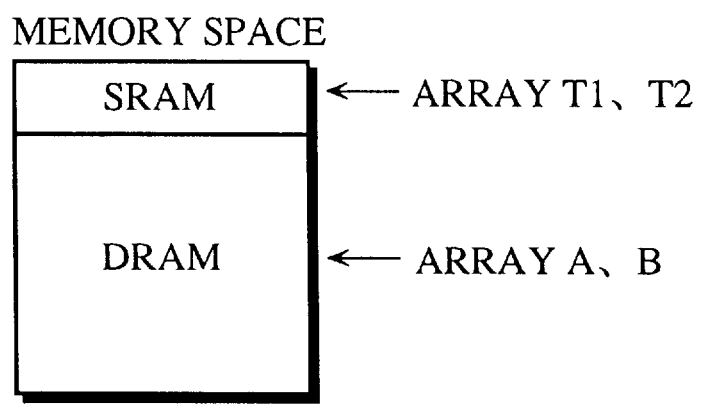
FIG. 19 shows a memory map in the second embodiment.

FIG. 19 shows the address spaces for the DRAM 11c and SRAM 11d. As is shown in the drawing, the DRAM area is the data area storing the array A and array B, and the SRAM space is the temporary memory area, i.e. the work area used when repartitioning the array. For example, array data T2 are allocated to the SRAM area, which are partitioned in a direction different from those in the data area and necessary for the execution statement 122 in FIG. 9 (the PDO statement 55 in FIG. 8).

The data need not be transferred between the PE1's for the execution statement 116 in FIG. 9 (the PDO statement 52 in FIG. 8), and the array A and array B are accessed in the DRAM area. To be more specific, when the MCU 32a judges that the address space is the one for the DRAM 11c, the data are accessed in the DRAM memory cycle.

As has been explained, the data are transferred (the data transfer statements 120 and 121) to the temporary areas T1 and T2 by the data transferring device 13 for the execution statement 122 in FIG. 9 (the PDO statement 55 in FIG. 8); for the direction of partition is different. As is shown in FIG. 15A, the memory access by the data transferring device 13 in each PE is performed by reading out the arrays A and B from the DRAM 11c and writing the array data T1 and T2 into the SRAM 11d. The MCU 32b checks whether the address space is the one for the SRAM 11d or DRAM 11c to control the access in the adequate cycle time.

While the data are transferred, the processor 10 performs the calculation (the execution statement 122). The processor 10 accesses the SRAM 11d storing T1 and T2, and thus the memory cycle for the MCU 32a in the processor 10 is the cycle time for the SRAM 11d.

The calculation result data are transferred as shown in FIG. 15B (the data transfer statements 123 and 124).

Figure 20:
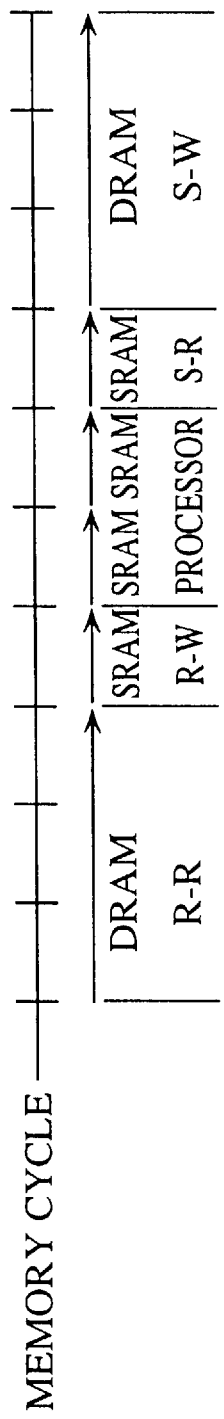
FIG. 20 shows the sequence of the calculation by a processor and the data transfer by a data transferring device in the second embodiment.

FIG. 20 shows the access sequence to the memory 11c and 11d when the ratio of the cycle time of the DRAM 11c to that of the SRAM 11d is 3:1. The drawing shows a case when accessing one data. In case of the array data A(1, /1/) allocated to the DRAM 11c, the readout (R-R) from the data transferring device 13 in the PE1 is in actual the access to the DRAM 11c. When the data transferring device 13 writes the readout data (R-W) into the temporary area T1 and T2 by accessing the SRAM 11d. Similarly, the readout from the temporary area T1 and T2 (S-R) is the access to the SRAM 11d, and the writing (S-W) to the array data A(1, /1/) after the data are transferred via the network 2 is the access to the DRAM 11c. The processor 10 performs the calculation to the temporary areas T1 and T2 by gaining an access to the SRAM 11d. Thus, of all six accesses, four accesses are carried out to the SRAM 11d.

As has been explained, by dividing the address space and adding a small high-speed memory, the memory access for the data transfer and calculation can be accelerated while reducing the bottle neck. The effect is significant in a system where an inexpensive low-speed DRAM is used to store a large-size array. The temporary area is smaller than the array and maintains the size when the array size on the program for multi-allocation becomes quite large. In FIG. 19, the addresses are allocated to the SRAM and DRAM in numerical order. However, when the T1 and T2 are larger than the SRAM, the data exceeding the SRAM are transferred to the DRAM area automatically and there will be no limitation for a program.

Note that the SRAM area may be used as a system area when it is not used for the array distribution or collection. In this case, the data received at random by the message transmission are written into the system area to be held temporarily. The message in the system area is decoded by the OS (Operating System) and transferred to a user program using a high-speed memory area. Thus, the overall operation speed is accelerated.

THIRD EMBODIMENT

Figure 21:
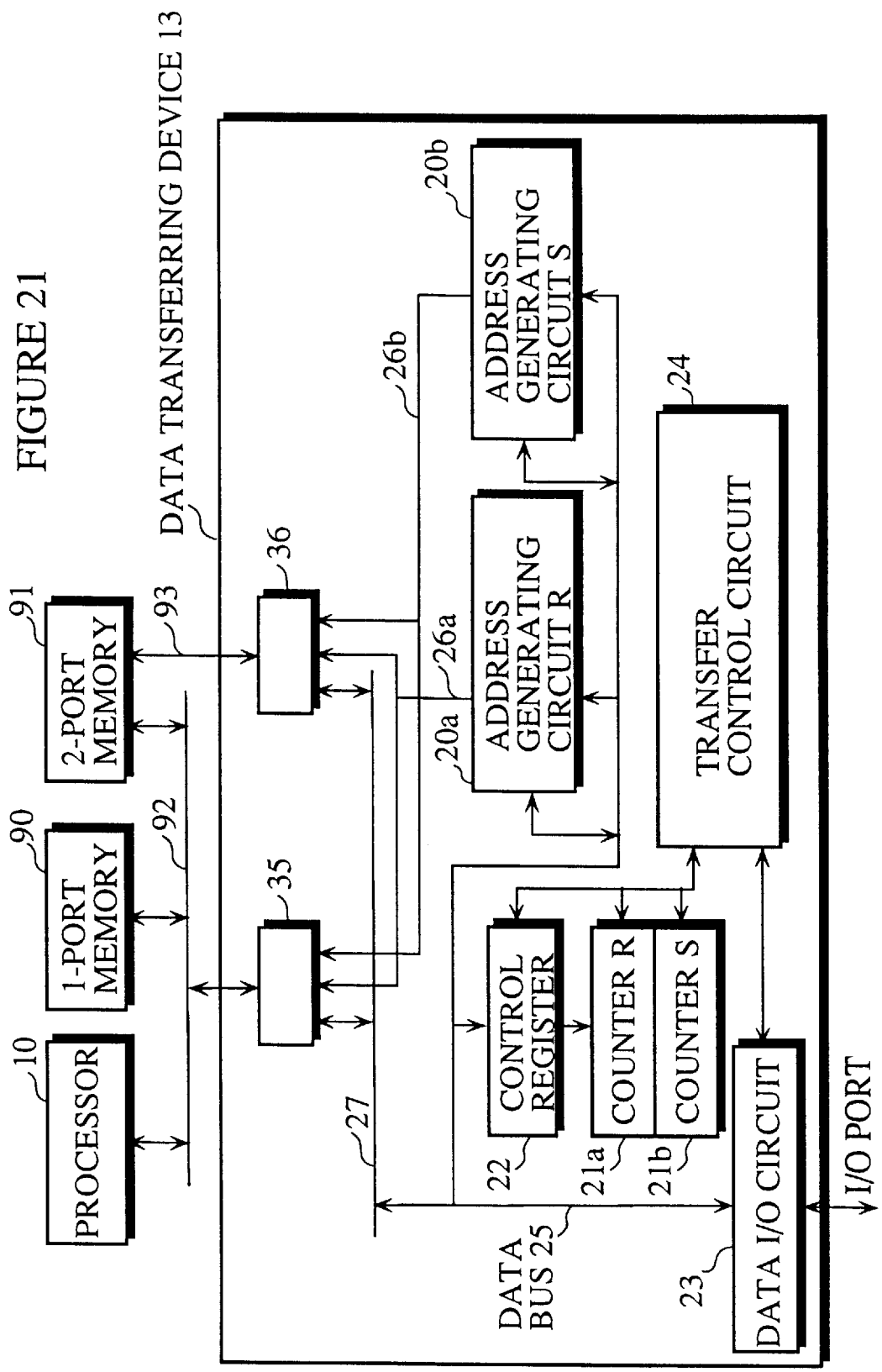
FIG. 21 is a view depicting a structure of a PE in accordance with a third embodiment of the present invention.

FIG. 21 is a view depicting the structure of a parallel computer in accordance with the third embodiment of the present invention. In the drawing, a PE1 comprises a processor 10, 1-port memory 90, 2-port memory 91, and a data transferring device 13. Like components are labeled with like numerals with respect to the first and second embodiments and the explanation is not repeated.

The 1-port memory 90 and 2-port memory 91 correspond to the data area and temporary memory area of the memory 11 in the first embodiment, respectively.

A bus 92 interconnects the processor 10, 1-port memory 90, one of the ports of the 2-port memory 91, and data transferring device 13.

A bus 93 connects the other port of the 2-port memory 91 and the data transferring device 13.

Bus switching circuits 35 and 36 switch the connection between the buses 92, 93 and the internal bus 27 and address buses 26a, 26b in the data transferring device 13. The bus switching circuits 35 and 36 are responsible for the access to the 1-port memory 90 and 2-port memory 91 from the data transferring device 13. The processor 10 accesses the memory via the bus 92 by switching the address spaces for the 1-port memory 90 and 2-port memory 91.

The operation of the above-constructed parallel computer will be explained.

Figure 22:
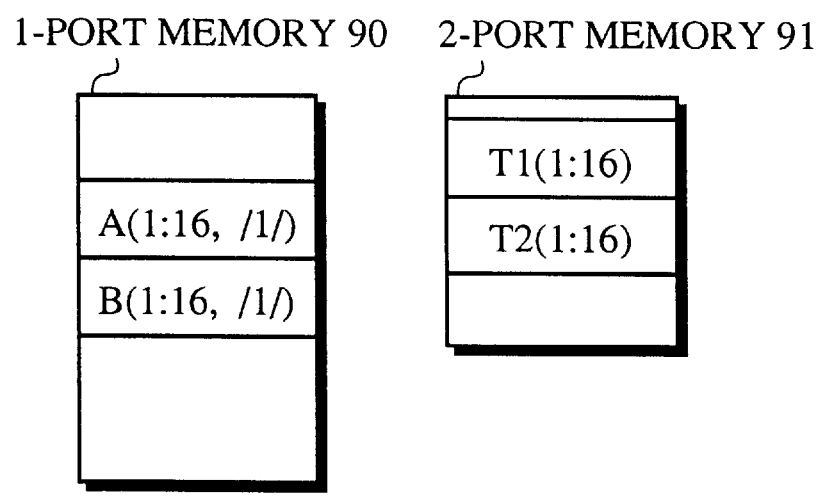
FIG. 22 shows a memory map in the third embodiment.

FIG. 22 shows the memory map of the 1-port memory 96 and 2-port memory 91. The arrays A and B in the program shown in FIG. 2 are allocated to the 1-port memory 90. The array data T1 and T2 accessed by the execution statement 122 (Equation 57) are allocated to the 2-port memory 91.

Figure 23:
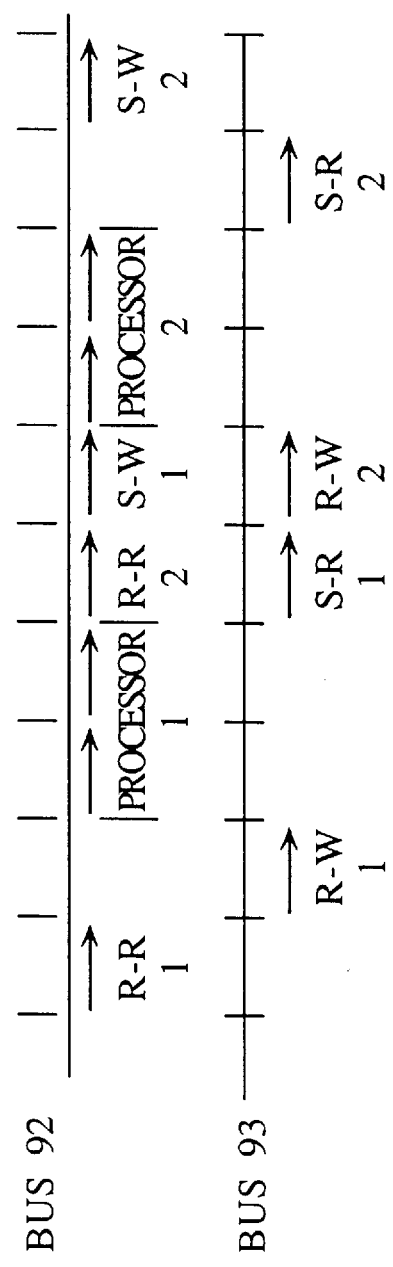
FIG. 23 shows the sequence of the calculation by a processor and the data transfer by a data transferring device in the third embodiment.

FIG. 23 shows an example of the memory access sequence. As has been explained, there occur memory accesses (R-R, R-W, S-R, S-W) necessary for the data transfer by the data transferring device 13 and the memory accesses (Processor 1 and Processor 2) necessary for the calculation by the processor 10 in the buses 92 and 93, respectively. Numerals 1 and 2 in the drawing denote the status where two kinds of data are successively accessed. The readout (R-R) and writing (S-W) of the array A (1, /1/) by the data transferring device 13 are the access to the 1-port memory 90. The readout (SR) and writing (R-W) of the array A (/1/, 1) in a different partition direction are the access to the 2-port memory 91 serving as the areas T1 and T2. Thus, as shown in FIG. 23, the first and second accesses by the data transferring device 13 can be multiplexed as if the number of the access times were reduced.

As has been explained, by allocating the temporary areas T1 and T2 to the 2-port memory 91, the data transferring device 13 can access the memory in parallel to transfer the data between the PE's, which accelerates the access speed. Also, since the 2-port memory 91 can be composed of the temporary areas T1 and T2, it is economical. If a memory with a high-speed access time is used as the 2-port memory 91 and the MCU 32 which can adjust the memory cycle to the address space is used, the memory access for the calculation by the processor 10 can be also accelerated. As a result, both the data transfer and calculation are performed faster.

Figure 24:
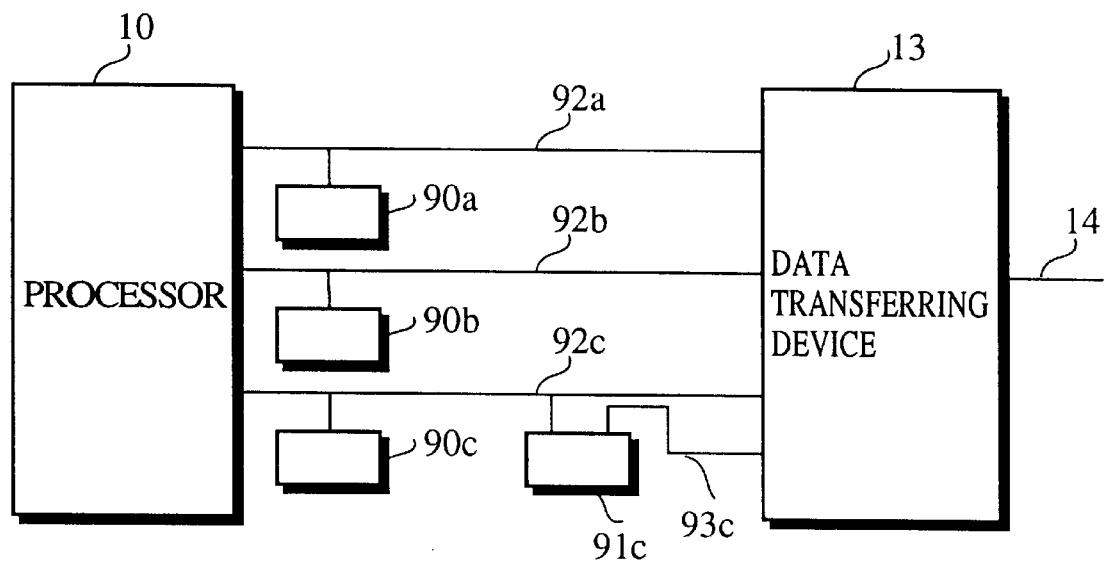
FIG. 24 is a view showing the PE in FIG. 21 with an extended bus.
Figure 25:
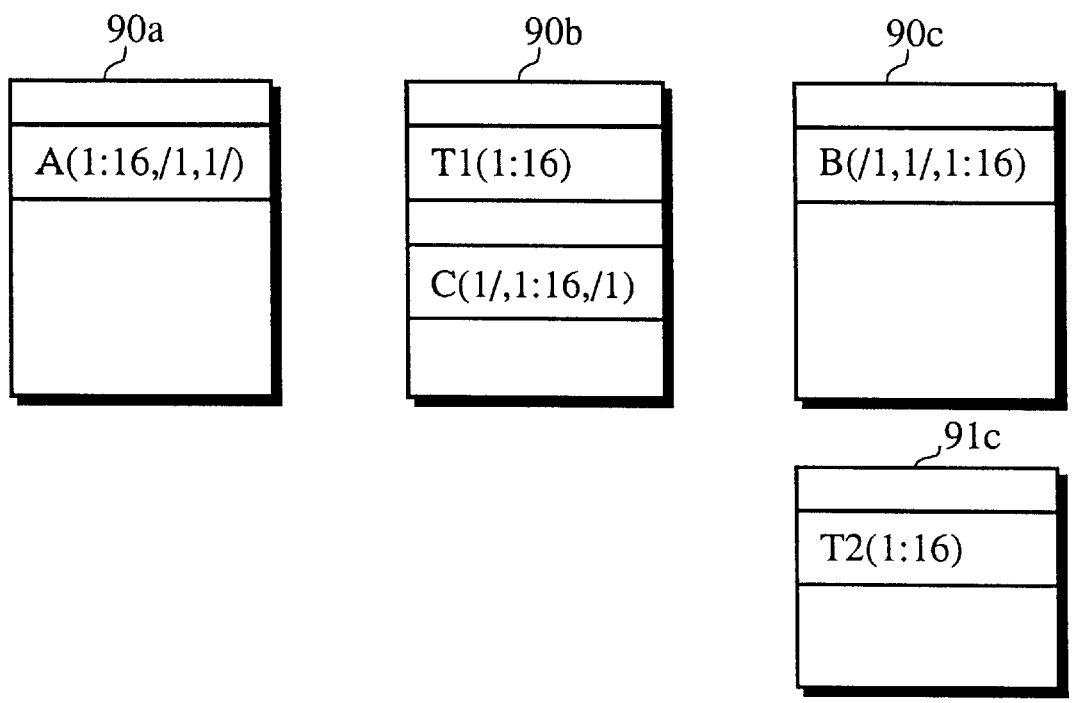
FIG. 25 shows a memory map for the structure in FIG. 24.

As shown in FIG. 24, a plurality of buses 92a, 92b and 92c may be provided to be connected to the 1-port memories 90a, 90b and 90c, respectively, and the 2-port memory 91c may be connected to the bus 93c. In this case, as is shown in the memory map in FIG. 25, the 3-D array is partitioned in three ways to be allocated to the 1-port memories 90a, 90b, and 90c, respectively. The array is partitioned in to the linear arrays in the X direction A(1:16, /1,1/), Y direction C(1/, 1:16,/1), and Z direction B(/1,1/,1:16). The calculation by the processor 10 in one direction will not cause contention with the memory access for the data transfer in a different direction by the data transferring device, enabling the parallel memory access and hence accelerating the memory access. By allocating the 2-port memory 91c as the temporary area, the memory access to the temporary area by the data transferring device 13 and the memory access to the 1-port memory 90c can be performed in parallel.

Although the present invention has been fully described by way of example with reference to the accompanying drawings, it is to be noted that various changes and modification will be apparent to those skilled in the art. Therefore, unless otherwise such changes and modifications depart from the scope of the present invention, the y should be construed as being included therein.

What is claimed is:

1. A parallel computer comprising a plurality of processor elements and a network interconnecting the same, wherein each of said plurality of processor elements includes:
   memory means including a first area and a second area, said first area storing a program and a data portion allocated to a processor element, said second area having a smaller capacity than said first area and temporarily storing working data;
   first data transferring means for performing a first data transfer, whereby data necessary for an operation are transferred to said second area from first areas of other processor elements via said network to form a new data portion therein;
   a processor for performing a first operation, whereby the data portion in said first area is processed and an operation result is stored into said first area, and for performing a second operation, whereby the new data portion in said second area is processed and an operation result is stored into said second area; and
   second data transferring means for performing a second data transfer, whereby the operation results stored in the second areas in the other processor elements are transferred to said first area of the processor element via said network.

2. The parallel computer of claim 1, wherein:
   said first area in said memory means stores at least one data portion for the first operation, said data portion being included in at least one piece of 2- or higher-dimension array data partitioned in a direction of dimension; and
   said first data transferring means transfers the data portions in the first areas of the other processor elements to said second area in the processor element to form a data portion of said array data partitioned in a different direction of dimension.

3. The parallel computer of claim 2, wherein:
   said processor repeats the first and second operations using the data portions by activating said first data transferring means before the second operation and said second data transferring means after the second operation;
   said first data transferring means performs, while said processor performs one of the first and second operations, the first data transfer using data portions other than the data portion being processed; and
   said second data transferring means performs, while said processor performs one of the first and second operations, the second data transfer using a post-second-operation data portion.

4. The parallel computer of claim 3, wherein:
   said second area in said memory means includes a first buffer and a second buffer, said first and second buffers having a same capacity, and when necessary for the operation by the processor, holding some of the data allocated to the first areas of the other processor elements;
   said first data transferring means switches between said first and second buffers as a destination for every first data transfer;
   said processor performs, while said first data transferring means performs the first data transfer, the second operation using the data portion in the buffer currently not used as the destination; and
   said second data transferring means transfers the data from the buffer storing the operation result of the second operation.

5. The parallel computer of claim 4, wherein
   said memory means is made of a memory element, and said second area has a faster access time than said first area.

6. The parallel computer of claim 3, wherein:
   the data portion included in two or more pieces of array data are allocated to said first area in said memory means; and
   said processor performs, while said first data transferring means performs the first data transfer using one piece of said array data, the first operation using the other pieces of array data.

7. The parallel computer of claim 6, wherein
   said memory means is made of a memory element, and said second area has a faster access time than said first area.

8. A parallel computer comprising a plurality of processor elements and a network interconnecting the same, each of said plurality of processor elements including a processor, memory means, and data transferring means interconnected via a bus, wherein:

said memory means includes a first area and a second area, said first area storing a program run by said processor and a data portion allocated to a processor element, said data portion being included in at least one piece of 2- or higher- dimension array data partitioned in a direction of dimension, said second area having a smaller capacity than said first area and temporarily storing working data; and said processor performs a first operation using the data portion in said first area, and a second operation using the data in said second area, and said data transferring means includes:

control information storing means for storing first control information and second control information, said first control information including a leading address and a size of the data portion stored in said first area, second control information including a leading address and a size of the data to be stored in said second area;

first address generating means for generating a first address on said first area based on the first control information;

second address generating means for generating a second address on said second area based on the second control information;

data I/O means for outputting data read out from said memory means to said network, and for inputting data from said network to be written into said memory means;

control means for performing a distribution control, whereby elements of the data portion in the processor element are distributed to other processor elements by means of said data I/O means using the first address, and for performing a collection control, whereby the elements of the data portions inputted from the other processor elements by means of said data I/O means are collected to the processor element using the second address.

9. The parallel computer of claim 8, wherein said control means includes:

distribution control means for reading out the elements of the data portion addressed by said first address generating means to distribute the same to the second areas in the other processor elements by means of said data I/O means;

collection control means for collecting the elements of the data portions inputted from the first areas in the other processor elements to said second area addressed by said second address generating means by means of said data I/O means;

re-distribution control means for reading out the elements of the data portion addressed by said second address generating means to re-distribute the same to the first areas in the other processor elements by means of said data I/O means; and re-collection control means for re-collecting the elements of the data portions inputted from the second areas of the other processor elements to said first area addressed by said first address generating means by means of said data I/O means, whereby said processor sets, before the second operation, the first and second control information for the elements of the data portion necessary for the second operation in said control information storing means while activating said distribution control means and collection control means, and sets, when said second operation ends, said first and second control information necessary to re-distribute and recollect the result of the second operation in said control information storing means while activating said redistribution control means and re-collection control means.

10. The parallel computer of claim 9, wherein:

said distribution control means distributes the elements of the data portion to the second areas of the other processor elements to form the data portion partitioned in a direction of dimension different from the direction of the data portion in said first area;

said collection control means collects the elements of the data portion to said second area of the processor element to form the data portion partitioned in a direction of dimension different from the direction of the data portion in said first area; and said re-distribution control means and re-collection control means restore the elements of the distributed and collected array data, respectively.

11. The parallel computer of claim 10, wherein:

said distribution control means and collection control means, while said processor performs one of the first and second operations, respectively distributes and collects the data portions other than the data portion being processed; and said re-distribution control means and re-collection control means respectively re-distributes and re-collects a post-second-operation data portion while said processor performs one of the first and second operations.

12. The parallel computer of claim 11, wherein:

said second area in said memory means includes a first buffer and a second buffer, said first and second buffers having a same capacity, and when necessary for the operation by said processor, holding some of the data allocated to the first areas of the other processor elements; said control means switches between said first and second buffers as a destination of the distribution/collection; and said processor performs the second operation using the data portion in the buffer currently not used as the destination while said data transferring means distributes/collects the data.

13. The parallel computer of claim 12, wherein said memory means is made of a memory element, and said second area has a faster access time than said first area.

14. The parallel computer of claim 11, wherein:

two or more pieces array data are allocated to said first area in said memory means; and said processor performs, while said dada transferring means performs the data transfer using one piece of array data, the first operation using the other pieces of data portions.

15. The parallel computer of claim 14, wherein said memory means is made of a memory element, and said second area has a faster access time than said first area.

16. A parallel computer comprising a plurality of processor elements and a network interconnecting the same, wherein each of said processor elements includes:

1-port memory means for storing a data portion allocated to a processor element in a first area, said data portion being included in 2- or higher- dimension array data partitioned in a direction of dimension;

2-port memory means for storing a data port ion of said array data partitioned in a different direction of dimension;

a processor for performing a first operation using the data portion in said first area and for performing a second operation using a data portion in said second area;

data transferring means including:

control information storing means for storing first control information and second control information, said first control information including a leading address and a size of the data portion stored in said first area, said second control information including a leading address and a size of the data portion to be stored in said second area;

first address generating means for generating a first address o n said first area based on said first control information;

second address generating means for generating a second address on said second area based on said second control information;

data I/O means for outputting data read out from one of said 1-port memory means and said 2-port memory means to said network, and for inputting data from said network to be written into one of said 1-port memory means and said 2-port memory means; and control means for reading out the data in said first area of the processor element using the first address to distribute the same to other processor elements by means of said data I/O means, and for collecting the data inputted by means of said data I/O means from first areas of the other processor elements to said second area of the processor element using the second address, a port of said 2-port memory means, said 1-port memory means, said processor, and said data transferring means being connected to a first bus, the other port of said 2-port memory means and said data transferring means being connected to a second bus.

17. The parallel computer of claim 16, wherein said control means includes:

distribution control means for reading out the elements of the data portion addressed by said first address generating means to distribute the same to the second areas in the other processor elements by means of said data I/O means;

collection control means for collecting the elements of the data portions inputted from the first areas in the other processor elements to said second area addressed by said second address generating means by means of said data I/O means;

re-distribution control means for reading out the elements of the data portion addressed by said second address generating means to re-distribute the same to the first areas in the other processor elements by means of said data I/O means; and re-collection control means for re-collecting the elements of the data portions inputted from the second areas of the other processor elements to said first area addressed by said first address generating means by means of said data I/O means, whereby said processor sets, before the second operation, the first and second control information for the elements of the data portion necessary for the second operation in said control information storing means while activating said distribution control means and collection control means, and sets, when said second operation ends, said first and second control information necessary to re-distribute and recollect the result of the second operation in said control information storing means while activating said redistribution control means and re-collection control means.

18. The parallel computer of claim 17, wherein:

said distribution control means distributes the elements of the data portion to the second areas of the other processor elements to form the data portion partitioned in a direction of dimension different from the direction of the data portion in said first area;

said collection control means collects the elements of the data portion to said second area of the processor element to form the data portion partitioned in a direction of dimension different from the direction of the data portion in said first area; and said re-distribution control means and re-collection control means restore the elements of the distributed and collected array data, respectively.

19. The parallel computer of claim 18, wherein:

said distribution control means and collection control means, while said processor performs one of the first and second operations, respectively distributes and collects the data portions other than the data portion being processed; and said re-distribution control means and re-collection control means respectively re-distributes and re-collects a post-second-operation data portion while said processor performs one of the first and second operations.

20. The parallel computer of claim 19, wherein:

said second area in said 2-port memory means includes a first buffer and a second buffer, said first and second buffers having a same capacity, and when necessary for the operation by said processor, holding some of the data allocated to the first areas of the other processor elements; said control means switches between said first and second buffers as a destination of the distribution/collection; and said processor performs the second operation using the data portion in the buffer currently not used as the destination while said data transferring means distributes/collects the data.

21. The parallel computer of claim 20, wherein said 2-port memory means is made of a memory element, and said second area has a faster access time than said first area.

22. The parallel computer of claim 19, wherein:

two or more pieces array data are allocated to said first area in said 1-port memory means; and said processor performs, while said dada transferring means performs the data transfer using one piece of array data, the first operation using the other pieces of data portions.

23. The parallel computer of claim 22, wherein said 2-port memory means is made of a memory element, and said second area has a faster access time than said first area.

* * * * *